United States Patent

Mueller et al.

(10) Patent No.: US 9,130,363 B2
(45) Date of Patent: Sep. 8, 2015

(54) LIGHTNING STRIKE PROTECTION MEANS AND FIBER COMPOSITE COMPONENT

(71) Applicant: Airbus Operations GmbH, Hamburg (DE)

(72) Inventors: Holger Mueller, Hamburg (DE); Claus Fastert, Hamburg (DE); Hauke Seegel, Hamburg (DE); Paulin Fideu Siagam, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/103,099

(22) Filed: Dec. 11, 2013

(65) Prior Publication Data

US 2014/0168847 A1    Jun. 19, 2014

Related U.S. Application Data

(60) Provisional application No. 61/737,113, filed on Dec. 14, 2012.

(30) Foreign Application Priority Data

Dec. 14, 2012    (EP) .................................... 12197223

(51) Int. Cl.
| | | |
|---|---|---|
| *H05F 3/00* | (2006.01) | |
| *H02G 13/00* | (2006.01) | |
| *B64D 45/02* | (2006.01) | |
| *B29C 70/88* | (2006.01) | |

(52) U.S. Cl.
CPC .............. *H02G 13/80* (2013.01); *B29C 70/885* (2013.01); *B64D 45/02* (2013.01)

(58) Field of Classification Search
USPC ......................................................... 361/218
See application file for complete search history.

(56) References Cited

U.S. PATENT DOCUMENTS

| | | | |
|---|---|---|---|
| 2009/0269596 A1 | 10/2009 | Rocker et al. | |
| 2010/0103582 A1* | 4/2010 | Shimp et al. ................... | 361/220 |
| 2010/0276536 A1 | 11/2010 | Lambert et al. | |
| 2012/0063050 A1* | 3/2012 | Langone et al. .............. | 361/117 |
| 2013/0118770 A1* | 5/2013 | De Jong et al. .................... | 174/2 |
| 2013/0149153 A1* | 6/2013 | Fujioka et al. ............ | 416/146 R |

FOREIGN PATENT DOCUMENTS

| | | |
|---|---|---|
| FR | 2924686 | 6/2009 |
| WO | 2010135318 | 11/2010 |

OTHER PUBLICATIONS

European Search Report, May 8, 2013.

* cited by examiner

*Primary Examiner* — Dharti Patel
(74) *Attorney, Agent, or Firm* — Greer, Burns & Crain Ltd.

(57) ABSTRACT

A lighting strike protection device for applying automatically to a fiber composite component. The protection device includes a reinforcement structure having a width that is less than a width of the metal strip. The fiber composite component having an integrated lighting strike protection.

11 Claims, 1 Drawing Sheet

LIGHTNING STRIKE PROTECTION MEANS AND FIBER COMPOSITE COMPONENT

CROSS-REFERENCES TO RELATED APPLICATIONS

This application claims the benefit of the U.S. Provisional Application No. 61/737,113, filed on Dec. 14, 2012, and of the European patent application No. 12 197 223.6 filed on Dec. 14, 2012, the entire disclosures of which are incorporated herein by way of reference.

BACKGROUND OF THE INVENTION

The invention concerns a lighting strike protection means for applying automatically to a fiber composite component and a fiber composite component with a lightning strike protection.

In modern aircraft construction components that are manufactured with fiber-composite plastics are widely deployed. In the structural regions of aviation vehicles carbon fiber-reinforced thermosetting plastics are primarily deployed, wherein carbon fiber-reinforced thermoplastic high-performance plastics are also encountered to some extent. Furthermore other reinforcing fibers, such as, for example, glass fibers, Kevlar® fibers, or Aramid® fibers, can be deployed. With the deployment of fiber composite plastics a considerable potential for weight saving ensues; amongst other factors this leads to increased ranges by virtue of reduced fuel consumption. Furthermore in comparison to the metallic materials, in particular the aluminum alloys, for a long time customary in aircraft construction, plastic materials have excellent corrosion and fatigue resistance, as a result of which the servicing and maintenance effort can be significantly reduced in the operation of such aircraft.

By virtue of the generally significantly lower electrical conductivity of the fiber composite plastics compared with metallic materials, additional measures must be taken, in particular for lightning strike protection and earth return paths for the on-board electrical systems. The earth return paths are achieved, for example, by means of additional copper lines with large cross-sections, while the lightning strike protection is achieved by means of metals integrated into the external surfaces of the structural components. At the present time structural components, such as, for example, shell modules for fuselage sections, are often produced with the aid of the so-called ATL-method ("Automated Tape Laying"). In the tape laying process prepreg materials having the shape of tapes, in particular carbon fiber tapes, that are preimpregnated with a resin and that have a common width from 75 mm to 300 mm are laid down in an automated manner by means of a suitable device on a form-defining molding tool in various spatial directions, until the fiber composite component that is being manufactured has achieved a prescribed material thickness in all regions.

An alternative laying method is the so-called AFP-method ("Automated Fiber Placement"). In the fiber placement process prepreg materials, in particular carbon fiber strands or carbon fiber bundles that normally are ⅛" to 1" wide are laid down automatically. Alternatively, the prepreg materials are replaced by dry fiber strands or dry fiber bundles.

Due to the enhanced width of the tapes to be laid down, the ATL-method is used basically for slightly curved or flat surfaces, while the AFP-method is preferred for more complex geometries.

In the procedures of previous known prior art, lightning strike protection means are manually applied before or after the fiber tapes have been laid down. For this purpose a ribbon-form copper foil is laid down and pressed down on load-bearing material in the form of overlapping widths. With the application of pressure and/or temperature, for example by means of a vacuum bag procedure in an autoclave, the construction is then cured to form the finished fiber composite component.

In the patent application WO 2010/135318 A2 a method for automatically laying down a lightning strike protection means is shown. The lightning strike protection means has a metal strip and a bendable reinforcement structure for stabilizing the metal strip during the automated laying process. The reinforcement structure is attached to the metal strip over the entire length and has the same width as the metal strip.

SUMMARY OF THE INVENTION

The object of the invention is to specify an alternative lighting strike protection means that allows fully automated manufacture of a fiber composite component with integrated lighting strike protection. Furthermore, it is an object of the invention to create a fiber composite component with lightning strike protection that has been manufactured in accordance with the method.

According to the invention, a lightning strike protection means for applying automatically to a fiber composite component has a metal strip and a bendable reinforcement structure for stabilizing the metal strip during a laying process, wherein the reinforcement structure is attached to the metal strip over the entire length of the metal strip. According to the invention, the reinforcement structure has a width that is less than a width of the lighting strike protection strip.

Due to the reinforcement structure the laying process of the lightning strike protection means can be undertaken in a fully automated manner without the need for any manual intervention from the external environment. During the laying process traction forces acting on the metal strip are taken up by the reinforcement structure, thus avoiding a deformation of the metal strip. By this means it is possible to produce a fiber composite component, in particular from a thermosetting fiber composite plastic with integrated lighting protections, fully automatically on the same laying machine that is also used for the laying down of load-bearing layer material, or dry reinforcing fiber strands. By this means, a significant increase in the efficiency of the production process ensures. The device preferably takes the form of a laying machine that is suitable for the ATL-Method or the AFP-Method. Hereby, a cost optimized production process ensues, which is also a high volume process, with at the same time a high level of process reliability, which leads to reliable reproducible production results, in particular with regard to dimensional stability and the electrical properties of the fiber composite components manufactured in this manner. As the reinforcement structure has a width that is less than a width of a metal strip, load-bearing layers of the fiber composite component being positioned on opposite sides of the metal strip can get in contact with each other. Hereby, the lighting strike protection means is fully integrated in the fiber composite component.

For the case in which prepreg material is used for building the reinforcement structure, the laminate construction can be cured immediately after the completion of the lying down process. For the case in which dry material is used for building the reinforcement structure the lighting strike protection means are laid down in an automated manner, then the laminate construction is infiltrated with a suitable resin and finally cured to form the finished fiber composite component—as in the case of the prepreg material.

Preferably, the reinforcement structure consist at least one group of unidirectional fibers extending in the longitudinal direction of the metal strip. Due to the unidirectional fibers in combination with their orientation, an elongation of the lighting strike protection means during installation is effectively prevented. Preferred fibers are carbon fibers, glass fibers, Kevlar® fibers and or Aramid® fibers. The at least one fiber group can comprise parallel fibers (fiber strand), twisted fibers (twisted fiber bundle), braided fibers (braided fiber bundles) and the like.

In one embodiment, the reinforcement structure is positioned in a center line area of the metal strip. Due to the central positioning of the reinforcement structure, the reinforcement structure is positioned in the line of a traction force acting on the metal strip during laying process, thus preventing a lateral deformation of the metal strip.

Additionally or alternatively, the reinforcement structure is positioned in opposite border areas of the metal strip. By means of the lateral positioning of the reinforcement structure, the border areas of the metal strip are stabilized during the laying process.

In one embodiment, a fiber group of the reinforcement structure in the central area of the metal strip is narrower than its fiber groups in the border areas of the metal strip. By this means, although only a reduced number of fibers are used, the metal strip is also stabilized in the central area.

In one embodiment, the reinforcement structure is positioned only on one side of the metal strip. Attaching the reinforcement structure only to one side of the reinforcement structure simplifies the manufacturing of the lightning strike protection means. If it can be ensured that the lightning strike protecting strip won't twist during the laying process around its longitudinal axis, positioning the reinforcement structure only on one side is preferred. Thus, if an AFP-machine is used, normally the reinforcement structure is applied to only one side of the lightning protection strip.

In another embodiment, the reinforcement structure is positioned on both sides of the metal strip. The positioning of the reinforcement structure on both sides of the metal strip can be useful by AFP-machines, as the lighting strike protection means can be twisted in the laying process due to its narrow format.

In one embodiment, the metal strip is a metallic fabric or a metallic foil. Due to its surface, a metallic fabric or a metallic foil enables an easy applying of the reinforcement structure.

In an alternative embodiment, the metal strip consists of metallic elements that are wound around the reinforcement structure. Hereby, the reinforcement structure is not fixed to outer surfaces of the lightning protection strip, but fully integrated in the lightning protection strip.

According to the embodiment comprising the metallic elements, at least one unidirectional metallic thread is provided that extends in longitudinal direction of the metal strip. By means of the at least one metallic thread it is ensured that the metallic elements are reliable connected. For instance, the at least one unidirectional metallic thread is positioned between two adjacent fiber groups of the reinforcement structure. Alternatively or additionally to the aforementioned example, the at least one thread is integrated in one fiber group and thus not separated from the fiber group as a single part.

In one embodiment, the reinforcement structure is made from dry material which, at the point in time at which it is being processed, is not preimpregnated with a resin. In order to fix the reinforcement structure to the metal strip, melting thermoplastic particles are applied to the dry material. Alternatively, the reinforcement structure is made from prepreg material. The advantage of the reinforcement structure made from prepreg material is that the existent resin can be taken to attach the reinforcement structure to the metal strip.

A preferred fiber composite component comprises at least one integrated the lighting strike protection means according to the invention. By this means a simplified manufacturing process for the fiber composite component ensues, which essentially does not include any manual operation.

Other advantage examples of the embodiment of the invention are the subject of further subsidiary claims.

BRIEF DESCRIPTION OF THE DRAWINGS

In what follows, preferred examples of the embodiments of the invention are elucidated in more detail with the help of schematic representations. Here.

DETAILED DESCRIPTION OF THE PREFERRED EMBODIMENTS

Figure 1:
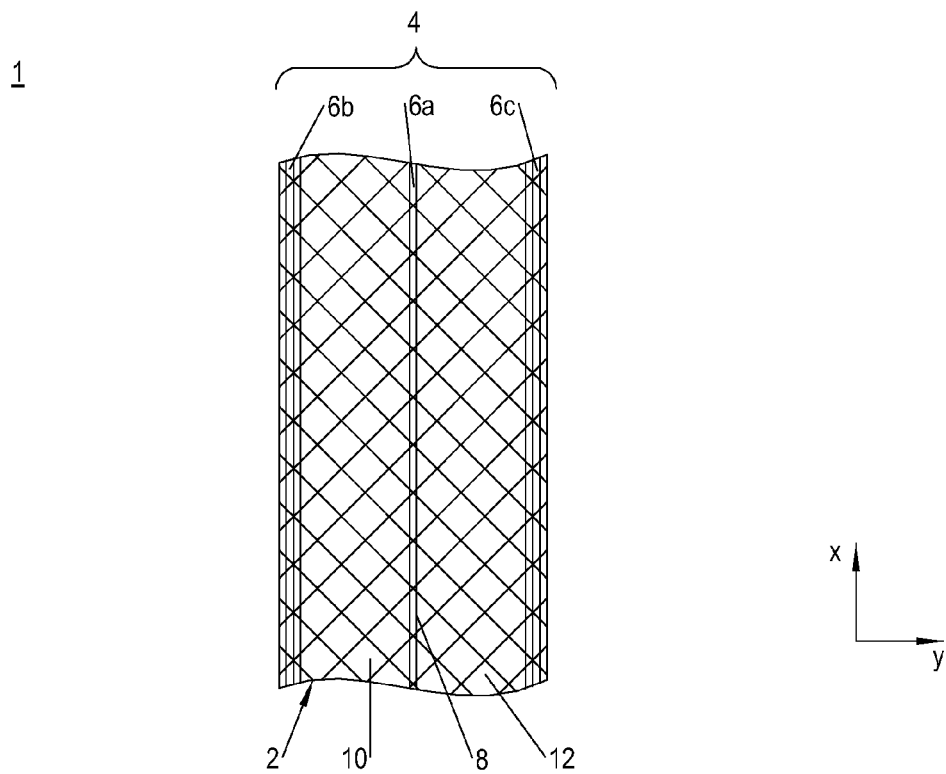
FIG. 1 shows a top view of a first embodiment of a lighting strike protection means according to the invention.

In FIG. 1, a first embodiment of a lighting strike protection means or device 1 for applying automatically to a fiber composite component is shown.

The non shown composite part comprises a laminate structure having a multiplicity of load-bearing fiber material made from carbon fibers, for instance, embedded in a matrix made from a thermosetting resin, for instance. Exemplary composite parts are aircraft wing shells and aircraft fuselage sections. Mainly in dependency on the geometry of the composite part, the laminate structure of the composite part is built up by an automated tape layer process (ATL) or by an automated fiber placement process (AFP). Common width for using an ATL-machine are 75 mm, 150 mm and 300 mm. Common width for using an AFP-machine are ⅛", ¼", ½" and 1".

The lighting strike protection means 1 has a metal strip 2, and a bendable reinforcement structure 4 for stabilizing the metal strip 2 during an automated laying process. The lighting strike protection means 1 has an endless longitudinal extension in a laying or traction direction x and a short extension transverse to the laying direction x in the y-direction. Preferably, it is laid down by the same laying machine as the load-bearing material. Thus, the lightning strike protection means 1 has preferably the same width as the load-bearing material.

In the shown first embodiment, the metal strip 2 is a flat metallic fabric, respectively mesh, in particular a copper fabric, a bronze fabric or a fabric made from a material that has a similar electrical conductivity. However, it can also be a metallic foil such as the copper foil. The metal strip 2 defines the width of the lighting strike protection means 2.

The reinforcement structure 4 takes up traction forces acting on the metal strip 2 during the manufacturing of the laminate structure of the composite part. In the shown first embodiment it is attached to one side of the metal strip 2. In the first embodiment, it comprises three groups 6a, 6b, 6c of at least one unidirectional fiber 8 each, wherein the groups 6a, 6b, 6c are spaced apart in transverse direction y. In order to avoid an inadequate increase of height of the lightning strike protection means 1 by the reinforcement structure 4, preferably, the fibers 8 of each group 6a, 6b, 6c are aligned parallel to each other.

The groups 6a, 6b, 6c respective the fibers 8 extend in x-direction and are positioned in a center line area and in both border areas of the metal strip 2.

The reinforcement structure 4 and in particular the groups 6a, 6b, 6c has/have a width that is less than the width of the metal strip 2. Hereby, non-reinforced areas 10, 12 of the metal strip 2 are created between the groups 6a, 6b, 6c, thus enabling a direct contact between the load-bearing materials of the fiber composite component being positioned on opposite sides of the lighting strike protection means 1.

As shown in FIG. 1, the fiber group 6a in the central area of the metal strip can be narrower than the fiber groups 6b, 6c in the border areas.

Preferably, the fibers groups 6a, 6b, 6c are made from prepreg materials. By this means, cohesion of the reinforcement structure 4 is realized by the existing resin of the prepreg material. In the case of dry fiber material, the reinforcement structure 4 can comprise melting thermoplastic particles for cohesion.

The fibers 8 are made from any kind of non-stretchable, thermal- and chemical resistance non-metallic material such as carbon. However, the fibers 8 can be also made from non-stretchable, thermal- and chemical resistance metallic material.

Figure 2:
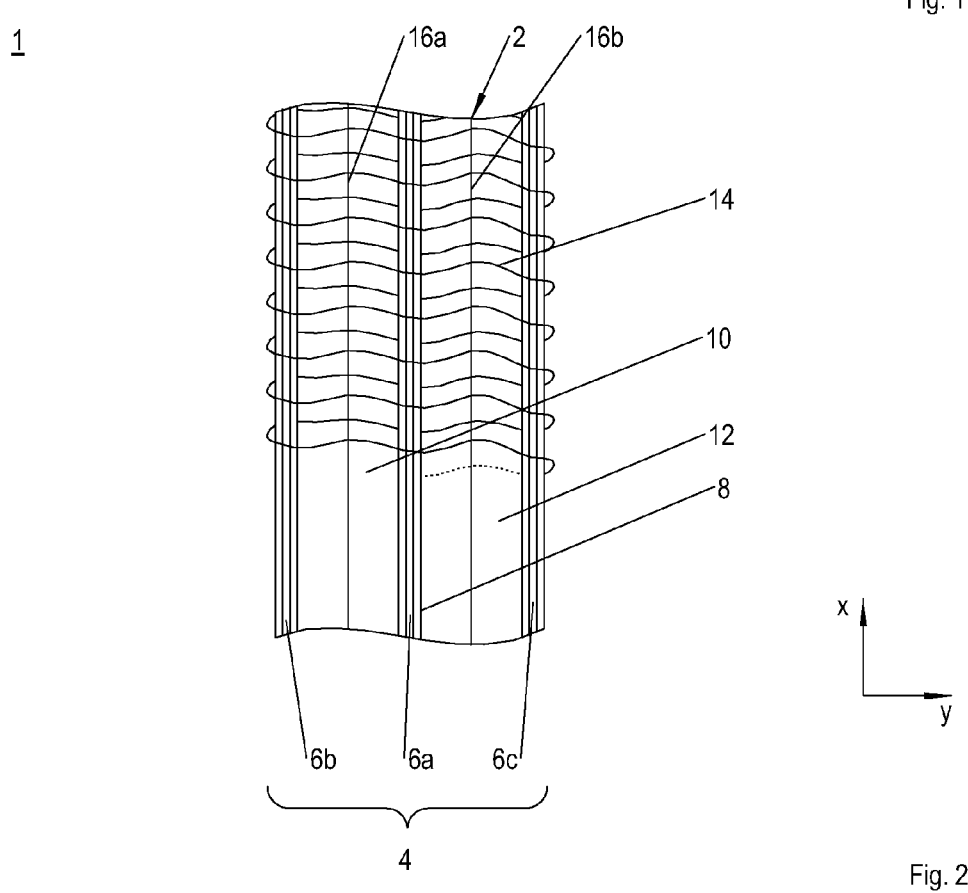
FIG. 2 shows a top view of a second embodiment of the lighting strike protection means according to the invention.

In FIG. 2 a second embodiment of the lighting strike protection means 1 according to the invention is shown. The lighting strike protection means 1 also comprises a metal strip 2 and a bendable reinforcement structure 4 comprising groups 6a, 6b, 6c of at least one unidirectional fiber 8 for taking up traction forces acting on the metal strip 2 during the manufacturing of the laminate structure of the composite part.

In difference to the first embodiment according to FIG. 1, the metal strip 2 consists of a plurality of metallic filaments 14, in particular copper filaments, which are wound around the fiber groups 6a, 6b, 6c. The filaments 14 extend in transverse direction y and forms a multiplicity of adjacent winding turns in longitudinal direction x.

In order to establish a reliable contact between the metallic filaments 14 among themselves, at least two supporting threads 16a, 16b are provided. In particular, the metallic filaments 14 are wound around the supporting threads 16a, 16b. In the shown embodiment, the threads 16a, 16b are positioned lateral to a central area of the metal strip 2 and extend in longitudinal direction (x-direction) of the metal strip 2. Thus, each thread 16a, 16b is positioned between two adjacent fiber groups 6a, 6b and 6a, 6c of the reinforcement structure 4.

Similar to the first embodiment according to FIG. 1, the reinforcement structure 4 consists of three fiber groups 6a, 6b, 6c of unidirectional fibers 7 such as carbon fibers. Preferably, the fiber groups 6a, 6b, 6c are made from prepreg materials. However, they can be also made from dry material comprising melting thermoplastic particles. The fiber groups 6a, 6b, 6c, respective the fibers 8, extend in longitudinal direction x and are positioned in the center line area and in both border areas of the metal strip 2. The groups 6a, 6b, 6c are also spaced apart from each other in transverse direction y, whereby non-reinforced areas 10, 12 are created between the fiber groups 6a, 6b, 6c, enabling a direct surface-to-surface contact between the load-bearing material positioned on opposite sides of the metal strip 2.

Contrary to the first embodiment shown in FIG. 1, the fiber group 6a in the center line area has the same width as the fiber groups 6b, 6c in the border areas.

As the first embodiment according to FIG. 1, the second embodiment of the lighting strike protection means 1 shown in FIG. 2 can also be fully integrated in an automated ATL-process or AFP-process. Thus, the metal strip 2 has a width corresponding to a width of the load-bearing materials such as 75 mm, 150 mm and 300 mm for ATL-machines and ⅛", ¼", ½", 1" for AFP-machines. However, different widths are possible.

Disclosed is a lighting strike protection means for applying automatically to a fiber composite component, wherein a reinforcement structure has a width that is less than a width of the metal strip, and a fiber composite component having an integrated lighting strike protection.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST 1 lightning strike protection means
2 metal strip
4 reinforcement structure
6a, b, c fiber group
8 fiber
10 non-reinforced area
12 non-reinforced area
14 metallic filament
16a, b supporting thread
x longitudinal direction
y transverse direction
Y

The invention claimed is:

1. A lightning strike protection means for applying automatically to a fiber composite component, comprising:
a metal strip, and
a bendable reinforcement structure for stabilizing the metallic strip during a laying process, the reinforcement structure being attached to the metal strip over the entire length of the metal strip and having a width that is less than a width of the metal strip;
wherein the reinforcement structure comprises fiber groups of unidirectional fibers extending in a longitudinal direction of the metal strip; and
wherein the fiber groups are spaced apart in a transverse direction.

2. The lightning strike protection means in accordance with claim 1, wherein one additional fiber group is positioned in a center line area of the metal strip.

3. The lightning strike protection means in accordance with claim 2 wherein a fiber group of the bendable reinforcement structure in the central area of the metal strip is narrower than the fiber groups in the border areas of the metal strip.

4. The lightning strike protection means in accordance with claim 1, wherein the bendable reinforcement structure is positioned in opposite border areas of the metal strip.

5. The lightning strike protection in accordance with claim 1, wherein the bendable reinforcement structure is positioned only on one side of the metal strip.

6. The lightning strike protection means in accordance with claim 1, wherein the bendable reinforcement structure is positioned on both sides of the metal strip.

7. The lightning strike protection means in accordance with claim 1, wherein the metal strip is one of a metallic fabric and a metallic foil.

8. The lightning strike protection means in accordance with claim 1, wherein the metal strip comprises metallic filaments that are wound around the reinforcement structure.

9. The lightning strike protection means in accordance with claim 8, wherein at least one unidirectional metallic thread is provided extending in a longitudinal direction of the metal strip.

10. The lightning strike protection means in accordance with claim 1, wherein the bendable reinforcement structure is made from dry material and provided with melting thermoplastic particles.

11. A fiber composite component with at least one integrated lightning strike protection means according to claim 1.

* * * * *